Feb. 19, 1929. 1,702,275

A. A. F. M. SEIGLE

INSTALLATION AND DEVICE FOR THE DISTILLATION AND DEPOLYMERIZATION
OF LIQUID OR LIQUEFIABLE HYDROCARBONS

Filed Dec. 19, 1922     5 Sheets-Sheet 1

ADULPHE ANTOINE FRANÇOIS MARIUS SEIGLE
INVENTOR;
By
his Attorney.

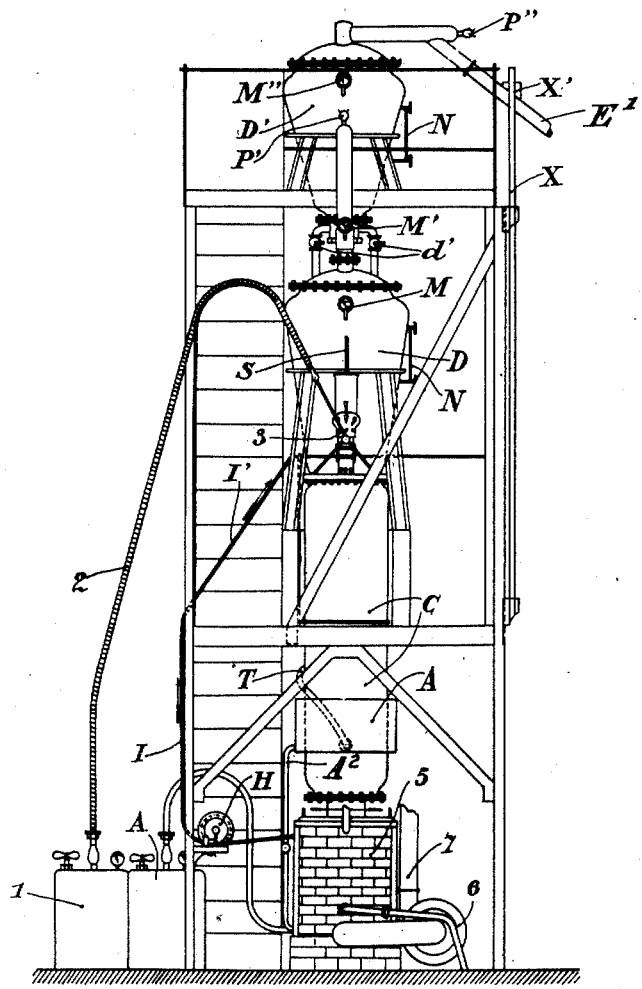

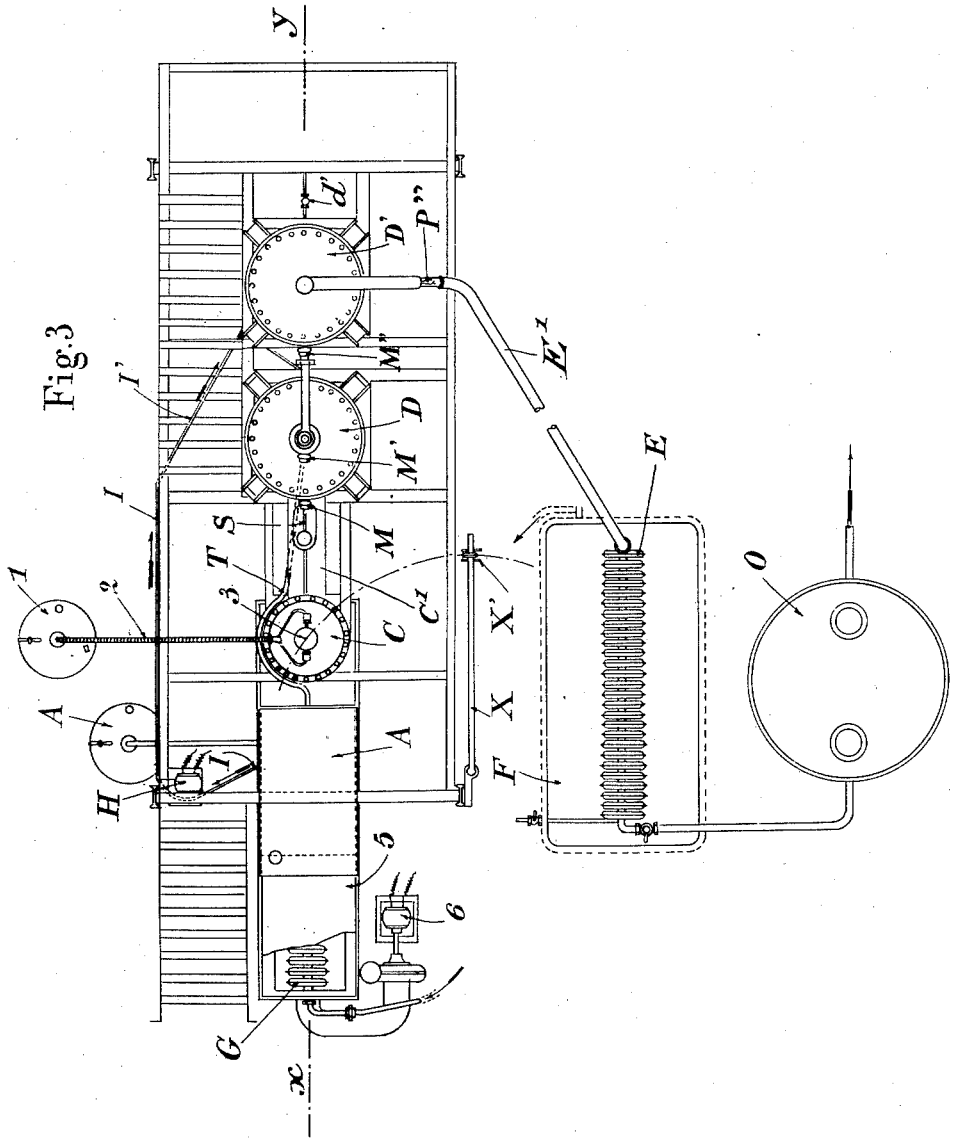

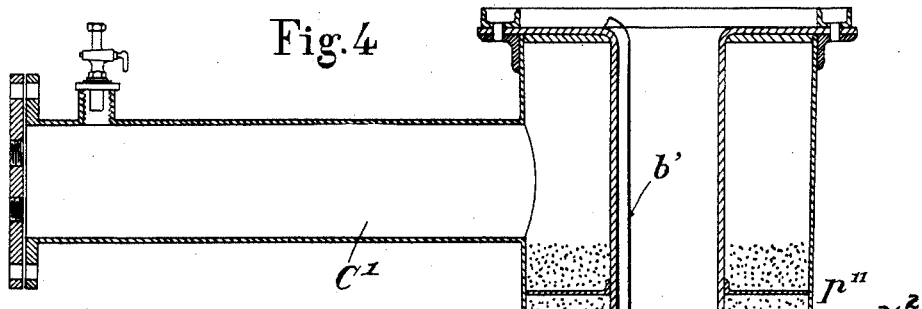
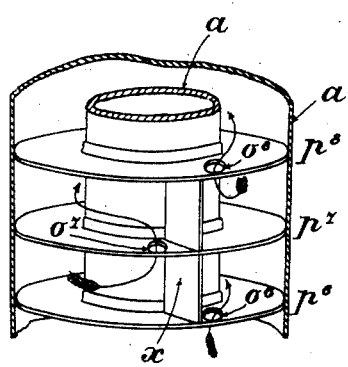
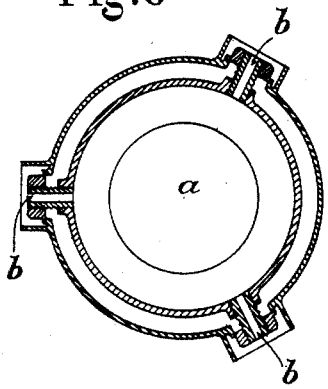
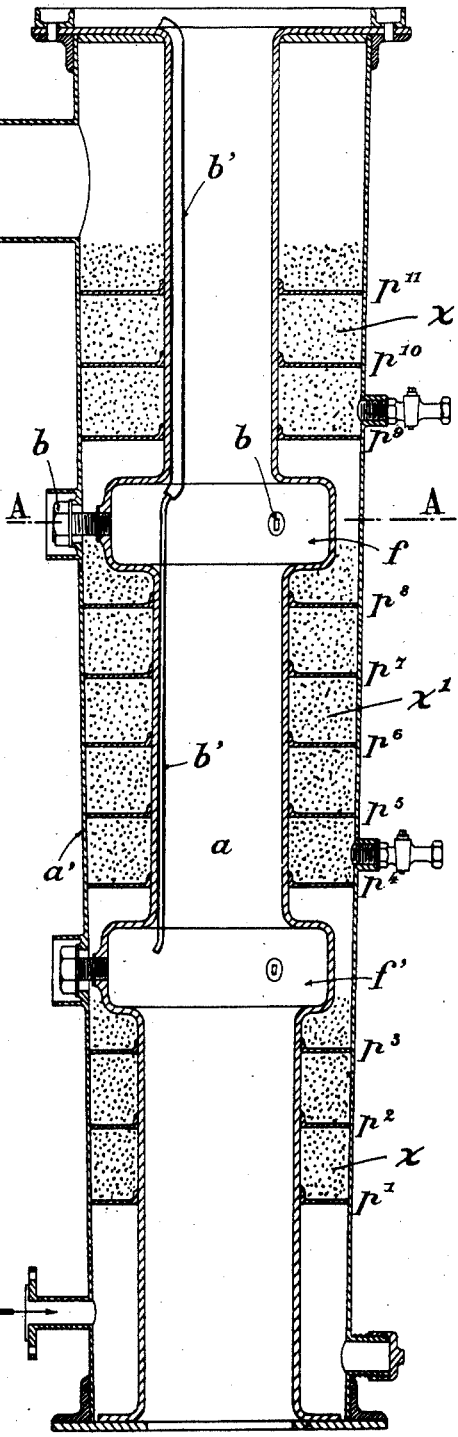

Feb. 19, 1929. 1,702,275

A. A. F. M. SEIGLE
INSTALLATION AND DEVICE FOR THE DISTILLATION AND DEPOLYMERIZATION
OF LIQUID OR LIQUEFIABLE HYDROCARBONS
Filed Dec. 19, 1922   5 Sheets-Sheet 5

Patented Feb. 19, 1929.

1,702,275

UNITED STATES PATENT OFFICE.

ADOLPHE ANTOINE FRANÇOIS MARIUS SEIGLE, OF PARIS, FRANCE.

INSTALLATION AND DEVICE FOR THE DISTILLATION AND DEPOLYMERIZATION OF LIQUID OR LIQUEFIABLE HYDROCARBONS.

Application filed December 19, 1922, Serial No. 607,901, and in France December 22, 1921.

This invention has for its object an installation affording the distillation and the depolymerization of certain liquid or liquefiable hydrocarbons, crude or residual, such as paraffins, rosins, naphthalenes, crude petroleum or naphtha, the mazouts, heavy oils from coal, peat, petroleum, shale, lignite and other products of like chemical composition.

The installation according to the present invention comprises one or more vertical retorts in which the hydrocarbons to be treated are vaporized, or in some cases, superheated, these hydrocarbons being carried to the lower part of said retorts at about atmospheric pressure, the retorts being provided at their upper ends with heating means in which the flame is directed downwards and with groups of cooler-expanders in which the vapour given off from the retorts is subjected to periods of expansion and cooling, the cooler-expanders of each group being superposed, and the lower cooler-expanders being situated above the retort or retorts, the circulation of the gases and vapours occurring by their natural ascension across the whole installation.

In this manner the gases or hydrocarbon vapours are subjected to a pressure which never exceeds the atmospheric pressure by more than 15 to 20 mm. of water. I thus overcome the risk of explosion and the escape of boiling oil or very inflammable gases which are produced in the known apparatus under very dangerous pressures.

Moreover, as in each group of cooler-expanders, the said apparatus are superposed, the vapours uncondensed in the lower apparatus ascend naturally into the upper apparatus, and the pumps which were used for this purpose may now be dispensed with.

Other characteristic features of my invention reside in the construction of the retorts which are constituted by two concentric metal tubes which may be, at will, separated from one another, the details of construction being clearly set forth in the following description.

Figure 1:
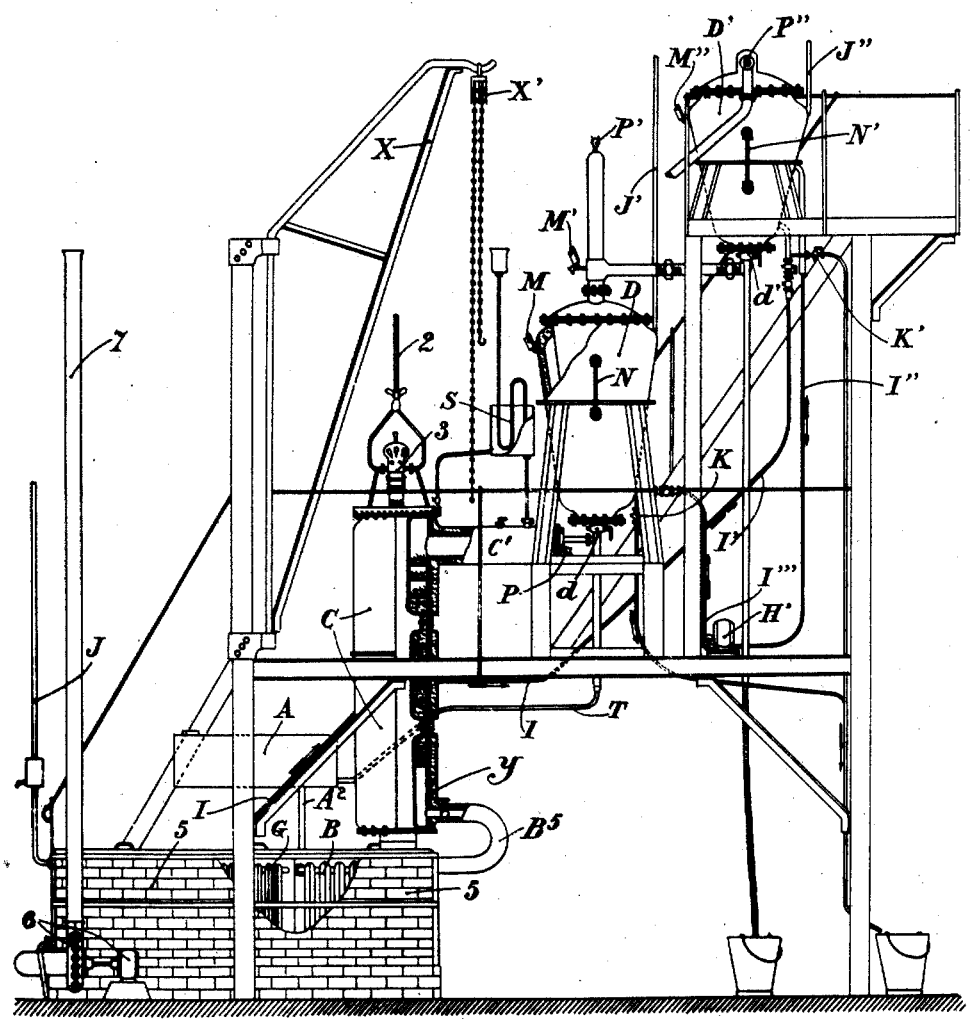
Figure 7:
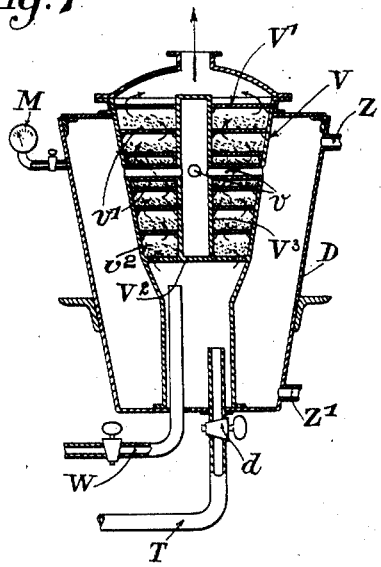
Figure 8:
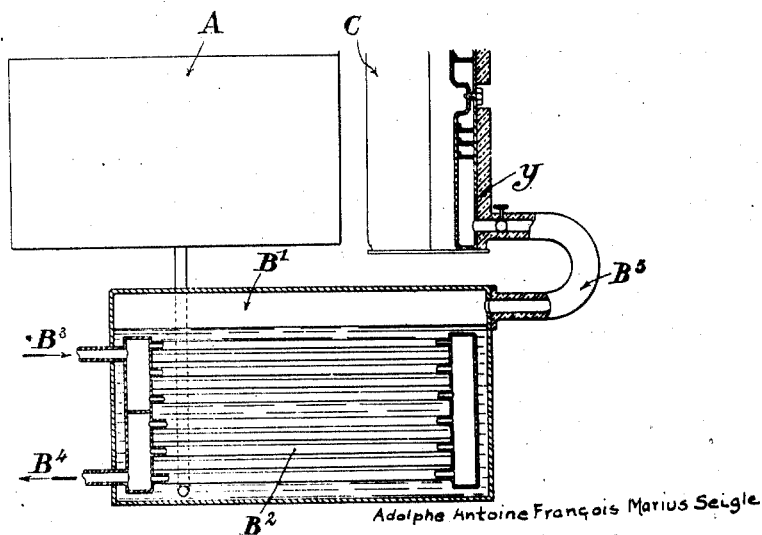

In the annexed drawings illustrating by way of example a plant comprising only one retort, two cooler-expanders and a few accessory parts:

Fig. 1 shows an elevation of the plant.
Fig. 2 is a side view of the same.
Fig. 3 is a plan view of the same.
Fig. 4 is a vertical axial section of one retort.
Fig. 5 is a perspective view of a part of said retort showing the path followed by the gases and vapours within the retort.
Fig. 6 is a cross section along line A—A (Fig. 4).
Fig. 7 is a diagrammatic axial section of an expanding and cooling apparatus, and
Fig. 8 is a partial view of a modified plant.

The first series of apparatus numbered 1—2—3—4—5—6—7 comprises the fuel pressure tank (1), the flexible pipe (2) connecting the tank to the burners of the retort, the burner or flame projector (3), the heat exchangers (5), the motor-turbine (6) for the suction of burnt gases, the exhaust pipe (7) for the burnt gases. It is easy to see which is the direction followed by the fuel and the combustion gases, and, also, how a maximum use of the heat is obtained, first in the retort and, finally, in the successive heat exchangers.

The second series of devices A—B—C—D—D' comprises the apparatus by means of which distillation and depolymerization of the raw material is obtained. Said devices are: A the feed tank containing the mazout or the crude oil, B the radiator used for a preliminary heating of the mazout, C the retort, D the first expander-cooler, D' the second expander-cooler said coolers being, moreover, provided with drain cocks $d$ and $d'$.

The devices indicated by F—G—H—I—I'—I"—H'—I''' are those used for heating and circulating the cooling water supplied to the expander-coolers. F is a condenser for condensing the hydrocarbons escaping in the gaseous state from the second cooler-expander; G is the radiator used for heating the water up to nearly 100°, H and H' are the pumps for circulating the water; I—I'—I"—I''' are water pipes. The steam produced in the cooler-expanders can escape through the pipes J—J'—J"; K and K' are water drainers; N and N' are water gauges connected to the coolers.

Figs. 4, 5 and 6 shows the details of the retort and a perspective diagram which give an understanding of the course of travel of the vaporized hydrocarbons therethrough, The retort is provided with an inner casing $a$ surrounded by a jacket $a'$ and by means of which the retort can be heated in a very intense manner chiefly in its higher part, the burning jet being projected from top to bottom inside the central casing $a$ of Fig. 4; the radiant heat of the flame is entirely utilized during its whole travel through the central casing, due to the fact that this powerful source of heat is only separated from the vapors or molecules to be distilled or depolymerized by the thin metallic wall which constitutes this central casing and it is well known that the transmission of the radiant heat is in inverse ratio to the square of the distance. Moreover, the burning jet is supplied, at various points along said casing, with cold air or, if necessary, with hot air, which secures a perfect and smokeless combustion of the atomized fuel employed, and prevents entirely, at the same time, the formation of any deposit of carbon upon the walls, such deposit requiring, in furnaces provided with nonrefractory walls, very frequent cleanings and a careful watching.

There are two different ways to effect the said air supply, according as the air is to be supplied in the cold or in the hot state. In order to introduce cold air, three or four plugs $b$ (Figs. 4 and 6) are provided which are equipped with check nuts which secure a tight joint between the plugs and the retort, and will allow only the introduction of the air through a hole in their center. In order to introduce hot air, three or four tubes $b'$ may be also provided along the central casing so that the air introduced from the top of the retort may enter each of the annular cavities $f$ and $f'$ (Fig. 4) of the casing, after having been strongly heated by passing through said tubes which are in direct contact with the flame all along their length.

The central conduit $a$ has a smaller cross section at the top than at the base, while the jacket $a'$ has a slightly tapered shape.

The horizontal discs which divide up the inner annular part of the retort, are disposed as shown in Figs. 4 and 5. They are parallel to one another and welded to the telescopic casing, or cast with it and, as shown in the drawings, they are merely in contact with the outer casing $a'$, whereby the central conduit $a$ together with the discs may be taken out of the jacket $a'$ for cleaning or repairing purposes. The technical and practical importance of such a retort consists not only of its removable inner casing, but, above all, in the circulation, alternately ascensional and rotating, of the vaporized hydrocarbons in a series of superposed partial retorts formed by the annular chambers between the successive discs or partitions $p^1 \ldots p^{11}$. In the device shown by Figs. 4, 5 and 6, said series comprises twelve partial retorts.

The liquid or liquefied hydrocarbons to be subjected to the distillation or depolymerization enter the lower partial retort after having been more or less heated.

The feed tank A (Fig. 1) is so arranged as to maintain a steady level which cannot exceed the level $p^1$, which, in this case, is that of the top partition of said lower partial retort, and the temperature is so regulated as to secure a sufficient vaporization in this partial retort. From there on the vaporized hydrocarbons ascend successively through the discs and the way followed up by said vaporized hydrocarbons is partially shown in the perspective view (Fig. 5) and is hereafter explained. For instance, the vaporized hydrocarbons entering, through hole $O^6$ in plate $p^6$, into the compartment between the two discs $p^6$ and $p^7$, are caused by the partition $x$ at right angle to the plate, to flow completely around the central casing, which further increases their temperature; then they escape from said compartment through hole $O^7$, punched into plate $p^7$ and are, again, caused to flow through a complete convolution, but in a reverse direction, around casing $a$, and so on. During said travel the vapors reach a temperature progressively increasing and which when they reach the top of the retort, will be about 600° centigrade.

The great advantage of this arrangement is that each compartment limited by two discs fills, one might say, the functions of a separate retort in which the temperature has a certain constant value.

Furthermore with such a device it becomes very easy to regulate the temperature of the molecules to be depolymerized, for the transmission of the radiant heat through the metallic partition of the casing is substantially instantaneous and the intensity of said heating action can be regulated at will by the use of a simple cock. Moreover, the heating taking place inside and concentrically with the products to be distilled or depolymerized, the heat losses are rendered nearly nil (if compared to the losses resulting from the use of primitive devices ordinarily used in this industry), by the use of the insulated envelope $y$ which surrounds the retort externally and, also, the other parts and tubes through which the vapors circulate at a high temperature.

A further advantage is not to be overlooked. As already said, during the operation of the present process, the vaporized hydrocarbons are subjected on the one hand to a pressure not higher than 15 to 20 mm. of water above atmospheric pressure, as, starting from the bottom of the retort, they move into zones of progressively increasing temperatures, which secures their natural ascension up into the retort, and, on the other hand, to the action of metallic chips $x$, $x^1$, $x^2$ (Fig. 4) disposed on plates $p^1 \ldots p^{11}$, whereby the hydrocarbons are transformed into products, already more or less volatile when cold and, much more so, when in the hot state.

The use of this type of retort permits of obviating several serious inconveniences which, up to now, did not allow the practical use of certain scientific data of interest to the industry.

This device secures:

1. The complete and very methodical use of the heat and of the catalytic properties of the various metal chips used.

2. An easy regulation of the dissociation, depolymerization or distillation in order to regulate the output and to produce more or less volatile hydrocarbons of the desired classes.

3. The suppression of the very high pressures now in use in this industry and consequently, the reduction of fire and explosion hazards, since in the present device, the complete industrial cycle is performed under the atmospheric pressure.

It must be noted that instead of being supplied to the retort in a liquid state, the hydrocarbons to be treated may be preliminarily heated and vaporized, and supplied to the retort in the state of vapours. In such case the radiator B (Fig. 1) is replaced by a feed heater $B^1$ (Fig. 8) to which the oil to be treated is supplied from the supply tank A. Said feed heater is of any known type, for instance of the type in which heating steam is supplied to a set of heating tubes $B^2$ through a pipe $B^3$ and is discharged through a pipe $B^4$. The oil is thus heated up to a maximum of 200° C., i. e. is merely vaporized, no change taking place in its chemical composition and the hydrocarbon vapours are led to the bottom of the retort through the pipe $B^5$.

The expander-coolers D and D' are shown in Figs. 1, 2, 3 and 7. Each expander-cooler comprises a reverse truncated cone V surrounded by an outer casing D preferably welded on said cone. Two cross plates $V^1$ and $V^2$ divide the latter into three parts, and through the middle part extends a vertical central tube $V^3$ closed at its ends by said plates $V^1$ and $V^2$ and connected by cross tubes $v$ with the annular space provided between the cone V and the casing D. The space provided within the cone V between the plates $V^1$ and $V^2$ is divided by removable perforated cross plates $v^1$, the perforations whereof are staggered, and corresponding perforations are provided in the plates $V^1$ and $V^2$, so that communication is thus established between the lower and upper parts of the cone V. The removable plates $v^1$ are intended to support metal chips.

Water is fed through the pipe Z to the space between the cone V and the casing D after having been preliminarily heated up to or near its boiling temperature under a determined pressure, and is discharged through the tube $Z^1$ while the mixture of hydrocarbon gases and vapours is fed to the apparatus through the pipe W and the uncondensed gases and vapours having passed through the metal chips supported by the plates $v^1$ are discharged at the upper part of the cone V. The hydrocarbons condensed within the apparatus are evacuated through the pipe T. The vaporized hydrocarbons, entering in a highly heated condition from the retort, undergo, in the first expander, then in the second, two successive coolings, very sudden but incomplete, owing to a quick and large absorption of heat resulting from the vaporization of boiling water. Said water is kept, inside each expander-cooler, at a determined temperature, which can be regulated by means of an outlet J' and J'', equipped with a tap which can be opened at will to the desired degree, in order to obtain a steam pressure corresponding to the desired and necessary temperature, which is about 250° to 300° centigrade for the first expander and about 120 to 130° centigrade for the second.

A more or less large quantity of calcium chloride or any other material is added to the water in the first expander in order to raise the boiling point of the water, so as to avoid maintaining a too high steam pressure in the outer receiver of the first expander in view of obtaining a temperature of 250 to 300° centigrade.

This water is first supplied to the second expander-cooler D' by means of a pump H and through the pipes I, I'; then it is sucked from said expander D' through pipe I'' by pump H' which forces it into the first expander D through pipe I'''.

The other devices used in the plant present no particular characteristics; they simply serve to improve or complete the industrial cycle by using, for instance, the waste heat escaping from the retort, in the heat exchanger (5), the same being of any type of fire brick box; a blower (6) located at the other end of the heat exchanger produces the draught and forces the combustion gas out; the use of the manometers M and M'' is necessary in order to watch the steam pressure inside the outer containers of the expander-coolers. The manometer M' serves for measuring the pressure of the vaporized hydrocarbons inside the first expander-cooler. Moreover, the pyrometers P, P' and P'' are used to control the temperatures during the operation of the thermo-chemical cycle. A safety valve S has also been provided between the retort and the first expander-cooler.

The operation of the above described plant is as follows:

The feed tank A is only used to maintain a constant level in the retort. The hydrocarbons discharged from said tank through pipe $A^2$ are circulated into the heat exchanger B wherein they are heated up to about 200° and, when thus heated, they will be promptly vaporized as soon as they reach the bottom of the retort through the pipe $B^5$.

The vapors thus produced rise successively into the superposed partial retorts, as has been above explained while flowing through the metallic chips, made of copper, iron, aluminum, nickel, etc. which, while dividing up the vapors into very thin streams, react chemically on their molecules.

The molecules, thus transformed, escape from the retort at a temperature varying between 550° and 650° centigrade and, through pipes $C'$ and $w$ enter the first expander-cooler D (the temperature of which is kept only at 250 to 300° centigrade); they are thus subjected to a very sudden but incomplete cooling and to a sudden expansion. The heavier hydrocarbons condense and return directly to the feed tank, through pipe T, in order to be subjected again to the thermochemical cycle of vaporization and depolymerization.

This expansion and sudden cooling are caused by the rapid absorption, by the boiling water, of the 537 calories which, as is known, are necessary for its passage from the liquid state to the state of saturated vapor. In other words, the volumes being equal, boiling water absorbs, for instance, ten times more heat in order to be vaporized, more or less instantaneously, than the 50 calories absorbed in passing from 15° to 65° centigrade in the pipes of one of the usual coolers of the petroleum or shale distilleries.

Moreover, the temperature of 250 to 300° C. maintained in the first expander-cooler permits, by the presence of the metallic chips which are located therein, the completion of the catalytic reactions commenced in the retort. Such reactions are favourably influenced by the expansion and the sudden cooling of the vaporized hydrocarbons.

The vaporized hydrocarbons discharged by the first expander-cooler at a temperature of about 280° C. are then subjected to a further expansion and a further sudden cooling in the second expander-cooler, inside which the temperature is about 180° and wherein the same phenomena of absorption of heat from the hydrocarbon vapors and of depolymerization are reproduced, but in a less intense manner.

Some condensable vapors, having dropped to the bottom of this second expander, are collected in order to be used, according to requirements, in their actual state, or rectified, as they only contain relatively light products, such as: light lubricating oils, kerosene, gasoline used for heavy cars. The hydrocarbons not yet condensed are directed through pipe $E'$ into a cooler E of any known type where they condense and form very light and volatile products including the light gasoline used in motor vehicles and aircraft engines and also a rather large quantity of petroleum ethers.

Some gases which are not condensed at the ambient temperature escape from this cooler E, and consist of the rich gas, and very volatile hydrocarbons used in perfumery, pharmacy and for the manufacture of varnishes. Said ethers or volatile hydrocarbons are condensed in the purifier O for the rich gas, either by pressure or by allowing said gases to bubble through some heavy oil which dissolves them and from which they are, later on, extracted by vacuum distillation or otherwise.

The rich gas which finally remains is identical with the oil gas used, for instance, by the railway companies for lighting their cars, etc. It is stored into a gasometer located after purifier O.

It is to be noticed that the metallic framework supporting the various apparatus permits easy access to the top of the retort, and to the expanders and other devices and that a pivoting bracket X equipped with a tackle $X'$ affords a means for the removal of the disc bearing casing $a$ of the retort from its outer jacket $a'$ (Figs. 4 and 5), at will and the replacement of it after cleaning, and, if required, after some of its plates or discs have been refilled.

Having now described my invention, what I claim as new and desire to secure by Letters Patent is:

1. An installation for the distillation and depolymerization of liquid hydrocarbons comprising a vertical retort provided with a central heating conduit and a passage for the hydrocarbons formed of a series of annular chambers surrounding said central conduit and arranged to cause the hydrocarbons to traverse said passage in alternately opposite directions, heating means disposed at the upper end of said central conduit, means for supplying, at a pressure substantially equal to the atmospheric pressure the hydrocarbons to be treated to the lower end of said passage, a number of superimposed expander-coolers, the lower expander-cooler being disposed above the vertical retort, means for connecting the upper end of said passage to the lower expander-cooler, means for connecting said expander-coolers to each other, a final cooling and condensing apparatus and means for connecting the upper expander-cooler to said final cooling and condensing apparatus.

2. An installation for the distillation and depolymerization of liquid hydrocarbons comprising a vertical retort constituted by a metallic casing, a metallic central heating tube within said casing, said central heating tube carrying metallic transverse plates, a longitudinal axial metallic partition dividing the annular spaces thus formed, means for connecting said annular spaces to each other successively on alternate sides of said partition, heating means disposed at the upper end of said central tube and directing the flames downwards, means for supplying, at a pressure substantially equal to the atmospheric pressure, the hydrocarbons to be treated to the lower annular space of said retort, a number of superimposed expander-coolers, the lower expander-cooler being disposed above the retort, means for connecting the upper annular space of said retort to the lower expander cooler, means for connecting said expander-coolers to each other, a final cooling and condensing apparatus and means for connecting the upper expander-cooler to said final cooling and condensing apparatus.

3. An installation for the distillation and depolymerization of liquid hydracarbons comprising a vertical retort constituted by an outer metallic casing, a metallic central heating tube within said casing the upper end whereof is smaller than the lower end, said central heating tube carrying metallic transverse plates contacting with said casing, a longitudinal axial metallic partition dividing the annular spaces thus formed, means for connecting said annular spaces to each other successively on alternate sides of said partition, heating means disposed at the upper end of said central tube and directing the flames downwards, means for supplying, at a pressure substantially equal to the atmospheric pressure, the hydrocarbons to be treated to the lower annular space of said retort, a number of superimposed expander-coolers, the lower expander-cooler being disposed above the retort, means for connecting the upper annular space of said retort to the lower expander-cooler, means for connecting said expander-coolers to each other, a final cooling and condensing apparatus and means for connecting the upper expander-cooler to said final cooling and condensing apparatus.

4. An installation for the distillation and depolymerization of liquid hydrocarbons comprising a vertical retort constituted by an outer metallic casing, a metallic central heating tube within said casing the upper end whereof is smaller than the lower end, said central heating tube carrying metallic transverse plates contacting with said casing, a longitudinal axial metallic partition dividing the annular spaces thus formed, means for connecting said annular spaces to each other successively on alternate sides of said partition, heating means disposed at the upper end of said central tube and directing the flames downwards, means for supplying additional air into said central tube at different levels, means for supplying, at a pressure substantially equal to the atmospheric pressure, the hydrocarbons to be treated to the lower annular space of said retort, a number of superimposed expander coolers, the lower expander cooler being disposed above the retort, means for connecting the upper annular space of said retort to the lower expander-cooler, means for connecting said expander-coolers to each other, a final cooling and condensing apparatus and means for connecting the upper expander-cooler to said final cooling and condensing apparatus.

5. An installation for the distillation and depolymerization of liquid hydrocarbons comprising a vertical retort constituted by an outer metallic casing, a metallic central heating tube within said casing, the upper end whereof is smaller than the lower end, said central heating tube carrying metallic transverse plates contacting with said casing, a longitudinal axial metallic partition dividing the annular spaces thus formed, means for connecting said annular spaces to each other successively on each side of said partition, heating means disposed at the upper end of said central tube and directing the flames downwards, tubes extending longitudinally through said central tube and opening at their upper ends into the atmosphere while their inner ends are respectively opening at different levels into said central tube for supplying additional hot air thereto, means for supplying, at a pressure substantially equal to the atmospheric pressure, the hydrocarbons to be treated to the lower annular space of said retort, a number of superimposed expander-coolers, the lower expander-cooler being disposed above the retort, means for connecting the upper annular space of said retort to the lower expander-cooler, means for connecting said expander-coolers to each other, a final cooling and condensing apparatus and means for connecting the upper expander-cooler to said final cooling and condensing apparatus.

6. An installation for the distillation and depolymerization of liquid hydrocarbons comprising a vertical retort provided with a central heating conduit and a passage for the hydrocarbons formed of a series of annular chambers surrounding said central conduit and arranged to cause the hydrocarbons to traverse said passage in alternately opposite directions, heating means disposed at the upper part of said central conduit, means for supplying at a pressure substantially equal to the atmospheric pressure, the hydrocarbons to be treated to the lower annular space of said retort, a number of superimposed expander-coolers, the lower expander-cooler being disposed above the retort, each of said expander-coolers comprising an inner chamber provided with perforated plates carrying suitable catalytic metallic chips and an annular chamber surrounding said inner chamber, means for supplying boiling water under a determined pressure to said annular chamber, means for connecting the upper annular space of the retort to the bottom of the inner chamber of the lower expander-cooler, means for connecting the inner chambers of the expander-coolers to each other, a final cooling and condensing apparatus and means for connecting the upper expander-cooler to said final cooling and condensing apparatus.

7. An installation for the distillation and depolymerization of liquid hydrocarbons comprising a vertical retort provided with a central heating conduit and a passage for the hydrocarbons formed of a series of annular chambers surrounding said central conduit and arranged to cause the hydrocarbons to traverse said passage in alternately opposite directions, heating means disposed at the upper part of said central conduit, means for supplying, at a pressure substantially equal to the atmospheric pressure, the hydrocarbons to be treated to the lower annular space of said retort, a number of superimposed expander-coolers, the lower expander-cooler being disposed above the retort, each of said expander-coolers comprising an inner chamber provided with perforated plates carrying suitable catalytic metallic chips and an annular chamber surrounding said inner chamber, means for supplying boiling water to said annular chamber, means for connecting the upper annular space of the retort to the bottom of the inner chamber of the lower expander-cooler, means for connecting the inner chambers of the expander-coolers to each other, a final cooling and condensing apparatus, means for connecting the upper expander-cooler to said final cooling and condensing apparatus and means for leading the gaseous products discharged by the latter into a tank containing liquid heavy hydrocarbons.

8. An installation for the distillation and depolymerization of liquid hydrocarbons comprising a vertical retort provided with a central heating conduit and a passage for the hydrocarbons formed of a series of annular chambers surrounding said central conduit and arranged to cause the hydrocarbons to traverse said passage in alternately opposite directions, heating means disposed at the upper end of said central conduit, a tank containing the hydrocarbons to be treated, means for vaporizing said hydrocarbons, means for supplying the vapors thus produced to the lower end of said passage at a pressure substantially equal to the atmospheric pressure, two superimposed expander-coolers, the lower expander-cooler being disposed above the vertical report, means for connecting the upper end of said passage to the lower expander-cooler, means for connecting said expander-coolers to each other, a final cooling and condensing apparatus and means for connecting the upper expander-cooler to said final cooling and condensing apparatus.

9. In an installation for the depolymerization of liquid hydrocarbons, means for vaporizing the hydrocarbons to be treated, a number of substantially vertical heated retorts adapted to provide for the natural ascension therethrough of the hydrocarbon vapours at a substantially atmospheric pressure and through zones of gradually rising temperatures, said retorts containing catalyzers adapted for the treatment of said hydrocarbon vapours at such temperatures, a number of superimposed expander-coolers disposed in series above said retorts, said expander-coolers being respectively adapted to produce concomitant, brisk and intensive expansion and cooling of the vapours issuing from said retorts and to provide for the natural ascension of said vapours therethrough and a final condenser connected to the uppermost expander-cooler.

In testimony whereof I have signed my name to this specification.

ADOLPHE ANTOINE FRANÇOIS MARIUS SEIGLE.